(12) United States Patent
Herbelleau

(10) Patent No.: US 6,257,292 B1
(45) Date of Patent: Jul. 10, 2001

(54) TIRE HAVING BEADS WITH NO BEAD POINT

(75) Inventor: Yves Herbelleau, Riom (FR)

(73) Assignee: Sedepro, Paris (FR)

( * ) Notice: Subject to any disclaimer, the term of this patent is extended or adjusted under 35 U.S.C. 154(b) by 825 days.

(21) Appl. No.: 08/782,891

(22) Filed: Jun. 5, 1996

Related U.S. Application Data

(63) Continuation of application No. 08/284,809, filed on Aug. 2, 1994, now abandoned.

(30) Foreign Application Priority Data

Aug. 6, 1993 (FR) .................................................. 93 09798

(51) Int. Cl.⁷ .......................... B29C 35/00; B29D 30/06; B60C 15/02; B60C 15/024
(52) U.S. Cl. .......................... 152/544; 152/539; 152/540; 264/326; 425/36; 425/54; 425/58
(58) Field of Search ..................... 152/539–540, 152/544, 454, 548; 264/326, 315; 425/49, 54, 58, 36

(56) References Cited

U.S. PATENT DOCUMENTS

| | | | |
|---|---|---|---|
| 1,408,678 | * | 3/1922 | Ayres .............................. 264/326 X |
| 1,432,004 | * | 10/1922 | Wheatley ......................... 264/326 X |
| 2,563,787 | * | 8/1951 | Keefe .............................. 152/544 X |
| 4,051,292 | | 9/1977 | Kresta et al. . |
| 4,057,091 | | 11/1977 | Gardner et al. . |
| 4,088,168 | * | 5/1978 | Boileau et al. .................. 152/540 X |
| 4,269,251 | * | 5/1981 | Harrington et al. ................ 152/544 |
| 4,345,634 | * | 8/1982 | Giron .............................. 152/539 X |
| 4,406,317 | * | 9/1983 | Merten ................................ 152/540 |
| 4,434,831 | * | 3/1984 | Uemura ........................... 152/544 X |
| 4,580,610 | * | 4/1986 | Jackson ........................... 152/539 X |
| 4,768,573 | | 9/1988 | Poque et al. . |
| 4,794,967 | * | 1/1989 | Charvet ........................... 152/544 X |
| 4,911,217 | * | 3/1990 | Dunn et al. ...................... 152/539 X |
| 5,025,844 | * | 6/1991 | Ueda et al. ...................... 152/544 X |
| 5,125,445 | * | 6/1992 | Watanabe ......................... 152/539 X |
| 5,218,861 | * | 6/1993 | Brown et al. .................... 152/539 X |
| 5,368,082 | * | 11/1994 | Oare et al. ....................... 152/544 X |
| 5,427,166 | * | 6/1995 | Willard, Jr. ...................... 152/544 X |
| 5,460,214 | * | 10/1995 | Fujita et al. ..................... 152/544 X |

FOREIGN PATENT DOCUMENTS

| | | |
|---|---|---|
| 860151 | 12/1952 | (DE) . |
| 1480849 | 2/1969 | (DE) . |
| 1089315 | 3/1955 | (FR) . |
| 1195309 | 11/1959 | (FR) . |
| 2061199 | 5/1981 | (GB) . |

* cited by examiner

Primary Examiner—Adrienne C. Johnstone
(74) Attorney, Agent, or Firm—Baker Botts L.L.P.

(57) ABSTRACT

A tire including beads 2 without bead points. Each bead's inner edge 22 is, for instance, of rounded shape.

4 Claims, 4 Drawing Sheets

TIRE HAVING BEADS WITH NO BEAD POINT

This application is a continuation of application Ser. No. 08/284,809, filed on Aug. 2, 1994 now abandoned.

BACKGROUND OF THE INVENTION

The present invention relates to tires and more precisely to the beads of tires.

The role of the beads of tires is known. It is to assure the "clamping" of the tire on the rim on which it is mounted. For this purpose, the shape of the bead of the tire is adapted to the shape of the rim for which it is designed; in other words, the outer side face of the bead as well as its seat (that is to say, its radially inner face) have a shape which corresponds substantially to the shape of the corresponding rim, if one neglects the slight differences for the purpose of assuring good clamping of the bead on the rim.

As to the shape of the inner side face, it corresponds more or less to the shape of the outer side face until encountering the seat of the bead in a zone which in the present description will be referred to as the inner edge of the bead, where there is generally present a rather sharp edge known as the "bead toe". The rubber which appears there is known as the "bead point".

Tires for passenger cars are mounted, as a rule, on single-piece rims having flanges which are substantially perpendicular to the axis of the rim and having seats which receive the bead. The seats have a frustoconical surface slightly inclined with respect to the axis of the rim (by an angle of about 5°) and are bordered by a protuberance known as a "hump" having a central groove which is radially lower than the seats. The bead toe cooperates with this protuberance which is arranged on the rim in order to impart to the tire the ability to remain mounted on the rim even when its inflation pressure is very insufficient.

The role of the inner edge of the bead is therefor important for the proper holding of the tire mounted on its rim.

When the tire is to be mounted on its rim or removed from it, tools are used which come into engagement with the rim substantially at the level of the lower edge of bead. These tools apply deformations very locally on the bead of the tire, which deformations may be very substantial to the extent of damaging the bead.

This leads to the need to reinforce the point of the bead of the tire in order that it can withstand without damage the stresses which the bead must undergo during its use. For this, textile strips are used, which increases the cost price of the tire.

It is also known that the mounting and removal of the tire cause a swinging of the bead by rotation around its center, that is to say, approximately around the bead wire that it contains. The stresses resulting therefrom are greater the greater the stiffness in rotation of the bead. The stiffness will be greater when using bead wires of a shape which is further from a circular cross section or when the anchoring of the carcass of the tire comprises numerous reinforcements intended to increase the strength thereof.

The present invention relates, in particular, to tires which include a bead on each side of the tire equational plane, each bead being defined by a substantially frustoconical seat which is inclined slightly with respect to the axis of the tire when the bead is in mounted position, an inner edge, an inner side face and an outer side face, the bead being intended to be applied radially from above on the seat of a rim, the inner side wall being directed towards the inner cavity of the tire, the inner edge forming a transition between said seat and the said inner side wall, and having a stiffness of the bead in rotation which is greater than 5 mN/radian. This covers the very great majority of ordinary tires, and it is intended to exclude tires which are especially developed so that the bead is easy to swing, such as, for instance, collapsible tires (see, for instance, U.S. Pat. No. 4,057,091) or tires designed to be mounted on special rims without central mounting grooves (see, for instance, U.S. Pat. No. 4,768,573).

SUMMARY OF THE INVENTION

The object of the present invention is to propose a new design of the bead of these tires which makes it capable of being subjected to the mounting and removal operations without damage and without impairing its ability to cooperate with the humps provided on the rim in order to avoid bead unseating and without the necessity of using textile reinforcements, such as those present in the bead points.

The inner edge of the tire of the invention is rounded; it therefore does not have the sharp edge forming an angle of less than 90° which usually separates the inner side face of the bead from its seat, from which edge there results the customary name of bead point. The angle in question is the angle which can be measured on a radial section of the bead between the tangent to the seat and the tangent to the inner side face, passing from one tangent to the other along the tire.

In another aspect, the tire in accordance with the invention is characterized by the fact that the inner edge has a transition surface the inclination of which, measured by the tangent along the contour seen in radial section, passes through an intermediate value between the inclination of the seat and that of the inner side wall.

By way of example of such a transition surface, the inner edge has at least one conical surface the inclination of which is intermediate between the inclination of the seat and the inclination of the inner side wall. This arrangement constitutes an alternative for the inner edge of a rounded shape.

In order to facilitate the molding of such a tire, the invention also proposes the use of a molding apparatus which makes it possible very precisely to control the shape of the bead at its inner edge. Instead of using a very flexible membrane, similar to an inner tube, a rigid mold is preferably used in order to assure the molding of the inner side face, at least in the portion thereof close to the inner edge.

It is well known that the ability of a tire to prevent loosening from the rim depends to a very great extent on the inner edge of the bead. The tires for passenger cars which are designed at the present time are subjected to tests in order to verify that, even upon a very sudden turn with reduced pressure, the beads remain in place on their seat.

It is known that the greater the seat pressure of the tire the less the tendency of the tire to leave its rim. Furthermore, the greater the rigidity in rotation of the bead, the less the tendency of the tire to come loose from its rim. It may be recalled that the seat pressure depends on the amount of rubber to be compressed between the bead wire and the radially outer surface of the seat of the corresponding rim. A certain level of seat pressure is necessary in order to be able to transmit a braking or driving torque between the rim and the tire. However, the greater the seat pressure, the greater the difficulties in mounting and/or removing the tire, particularly removal with portable tools. The designer of the tire therefore seeks to achieve a good compromise between safety (little sensitivity to loosening from the rim), obtained by controlling the clamping and the rigidity in rotation of the tire, and the ease of mounting/removal.

The tire in accordance with the present invention, with rounded inner edge and without bead point retains as good performance as the tire with bead point with respect to its very low propensity to loosen from the rim when mounted on its rim, since it permits an increase both of the seat pressure and of the rigidity in rotation on the rim while retaining the same ease of mounting it on its rim or removing it from its rim.

The following description, read with reference to the accompanying drawing, will make it possible fully to understand the invention.

DESCRIPTION OF PREFERRED EMBODIMENTS

Figure 1:
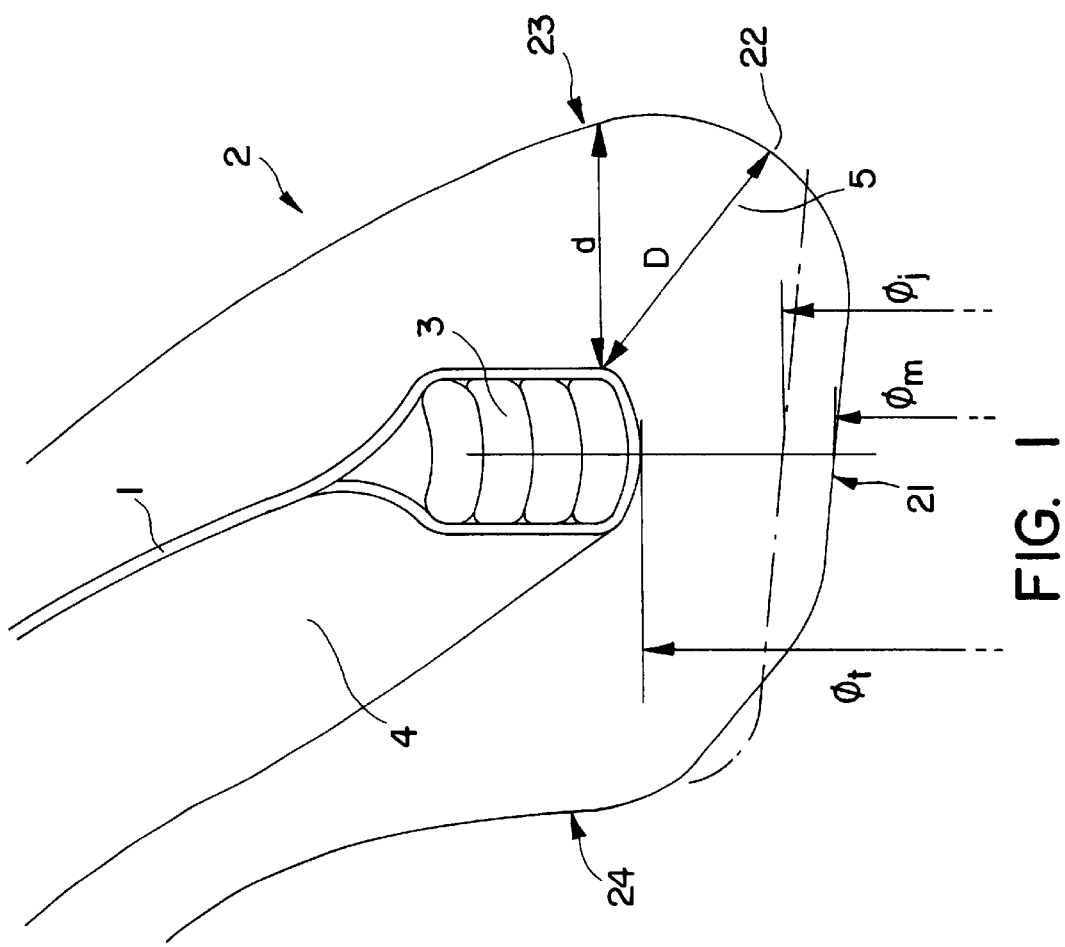
FIG. 1 is a view in radial section through a tire bead in accordance with the invention.

The tire bead shown in FIG. 1 includes a bead wire 3 formed in this case by the winding of a profiled member of curved cross section. It also includes a carcass 1 of the monofil type anchored to the bead wire by the fact that the single cord constituting the carcass forms forward and return paths with respect to each bead wire around which it is very intimately pressed. The carcass and the anchoring thereof to a carcass anchoring means, namely, the bead wire are constructed in the manner explained in U.S. Pat. No. 4,801, 344. This arrangement is, to be sure, not limitative, and other arrangements can be adopted within the bead. All the components which the bead contains have not been indicated in detail since, in general, the present invention does not directly concern their selection and location, but essentially proposes a new shape for the inner edge of the bead.

It will merely be pointed out that the bead has a rubber bead filler 4, applied for instance against the side of the carcass 1. The bead is defined by an outer side face 24, by its seat 21 which is intended to rest on the rim (the seat having a substantially frustoconical surface) and then by an inner side face 23. Between the seat 21 and the inner side face 23 there is a zone 5 defined by the inner edge 22 of the bead. It is seen that this inner edge 22 assures a very progressive connection between the seat 21 and the inner side face 23. In radial section, the inner edge has a rounded shape in which the thickness of the rubber in a segment of the zone 5 increases from d to D, as shown in FIG. 1, the segment being defined by a line between the radially innermost and axially innermost edge of the circumferentially extending bead wire embedded in the bead for anchoring the carcass and a point on the inner side face, which point moves from a position in which the line is parallel to the axis of rotation of the tire to a radially inner position, so that if the bead should pivot relative to the tire during the removal of the tire from the rim, the seat pressure will not rise. The radius of curvature is preferably greater than or equal to 5 mm.

As to the materials used, it can be noted that the zone 5 does not contain any reinforced rubber or reinforcement in the form of a textile strip or the like. It is formed of material similar to that which can usually be found below the bead wire.

A tire $T_1$, the bead of which was developed in the manner which has just been indicated, of size 175/70 HR 13, was compared with a tire $T_2$, of the same dimensions, reinforced by the same bead wire and the same carcass, and provided with a bead point, and it was also compared with a Michelin MXL tire of the same dimensions, which is also provided, as well known, with a bead point. These tires were subjected to a test 1 making it possible to note the inflation pressure under which the bead has a tendency to leave its seat when a vehicle driven at 52 km/hr enters into a turn of a radius of 20 m. The seat pressure rate is defined by the formula $$S=(\phi_j-\phi_m)/(\phi_t-\phi_j)$$

in which $\phi_t$ is the diameter measured below the bead wire, $\phi_m$ is the diameter measured below the tire as molded and in the same plane perpendicular to the axis of rotation as the plane containing the diameter $\phi_t$, and $\phi_j$ is the diameter measured on the rim seat and in the same perpendicular plane.

Figure 4:
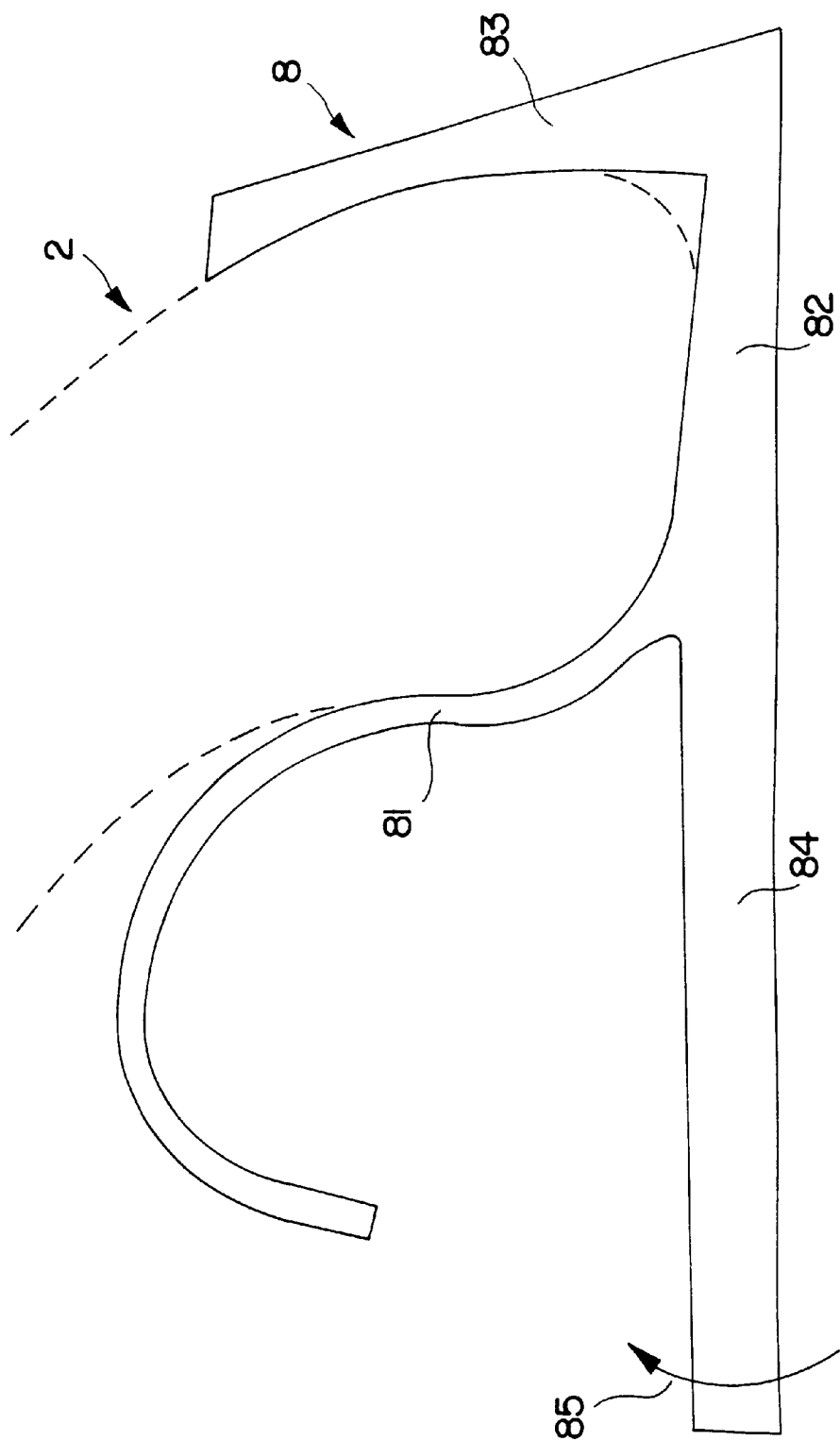
FIG. 4 illustrates how the stiffness in rotation of the bead has been determined.

The stiffness in rotation of the beads was noted in accordance with the method explained below, using a tool illustrated in FIG. 4. The bead 2 was inserted in a rim piece 8 comprising a flange 81, a seat 82, and an additional plate 83 extending along the inner side face 23 up to about the same height as the flange 81. Circumferentially, this rim piece 8 is developed over a short length, of 40 mm, in order to note a stiffness comparable to that opposing the stressing of the bead by levers, such as those used upon the mounting or dismounting of tires. The moment of rotation C is applied to the lever arm 84, as diagrammatically indicated by the arrow 85 in FIG. 4.

The following values were obtained:

|  | Test 1 | S | C |
| --- | --- | --- | --- |
| Tire T1 | 0.9 bar | 0.7 | 14 mN/radian |
| Tire T2 | 0.9 bar | 0.7 | 14 mN/radian |
| Tire MXL | 0.9 bar | 0.7 | 10 mN/radian |

In addition to these performances there was also judged the suitability for mounting and dismounting, which is deemed poor if damage appears on the inner edge of the bead. The tire $T_2$ is damaged rapidly while the tires $T_1$ and MXL remain free of any injury. It is seen that in all cases in which the resistance to swinging of the bead is substantial (see values of C for tires $T_1$ and $T_2$ above) the invention makes it possible very effectively to avoid any damage caused by the mounting or removal tools, while assuring sufficient ability of the tire to remain on its seat. The tire of the invention has an excellent level of performance with regard to this criterion, comparable to the best types of bead of classical shape having a bead point reinforced by a protection strip.

In the prior art, in order to assure the molding of the bead, recourse is generally had to a rigid molding part which molds both the outer side face 24 of the bead and the seat 21. On the other hand, the inner side face 23 is generally molded by means of a flexible membrane which is deployed within the cavity formed by the tire when the tire is placed in a vulcanization press. It is also known per se to use a rigid mold in order to assure the molding of the inner cavity of the tire.

In order perfectly to control the shape of the inner edge of the bead, the invention proposes that the part 6 of the mold (see FIG. 2) assuring the molding of the inner cavity of the tire be a rigid part (in opposition to the flexible membranes customarily used) which extends below the bead so as to encounter the mold part 7 which assures the molding of the outer side face of the bead and of the seat not at the place of the inner side face but at a place offset axially below the zone 5. Thus, the method of molding the bead of a tire the outer surface of said bead comprising, in particular, a seat and a side wall oriented towards the inner cavity of the tire, said bead being intended to rest radially above the seat of a rim, the seat and said side wall being molded by at least two different molding means, is characterized by the fact that in order to mold the side wall, a reentrant molding means is used, which assures both the molding of at least a part of the inner side face and the molding of a part of the surface of the bead located radially below the bead.

Figure 2:
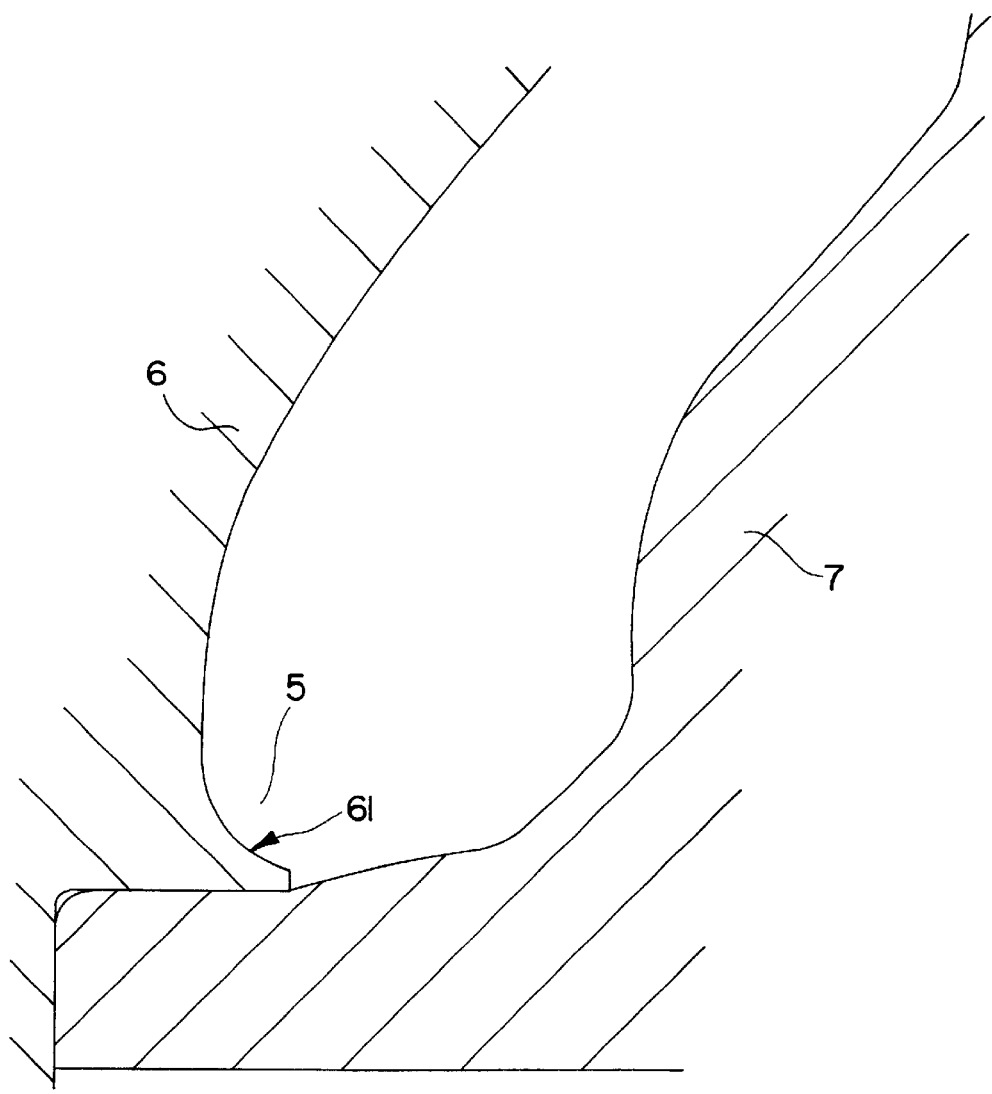
FIG. 2 shows, in radial section, a mold adapted to produce the tire shown in FIG. 1.

One can, for instance, use a reentrant molding means the base of which, that is to say the radially lower part, is provided with a rounded surface 61, as shown in FIG. 2. The radius of curvature of said molding surface is preferably greater than or equal to 5 mm. A small burr is thus formed on the surface of the tire bead seat at the interface between the re-entrant mold part 6 and the mold part 7 (see FIG. 2). In this way a tire can be molded with a bead having an inner edge of rounded shape as viewed in meridian section.

Figure 3:
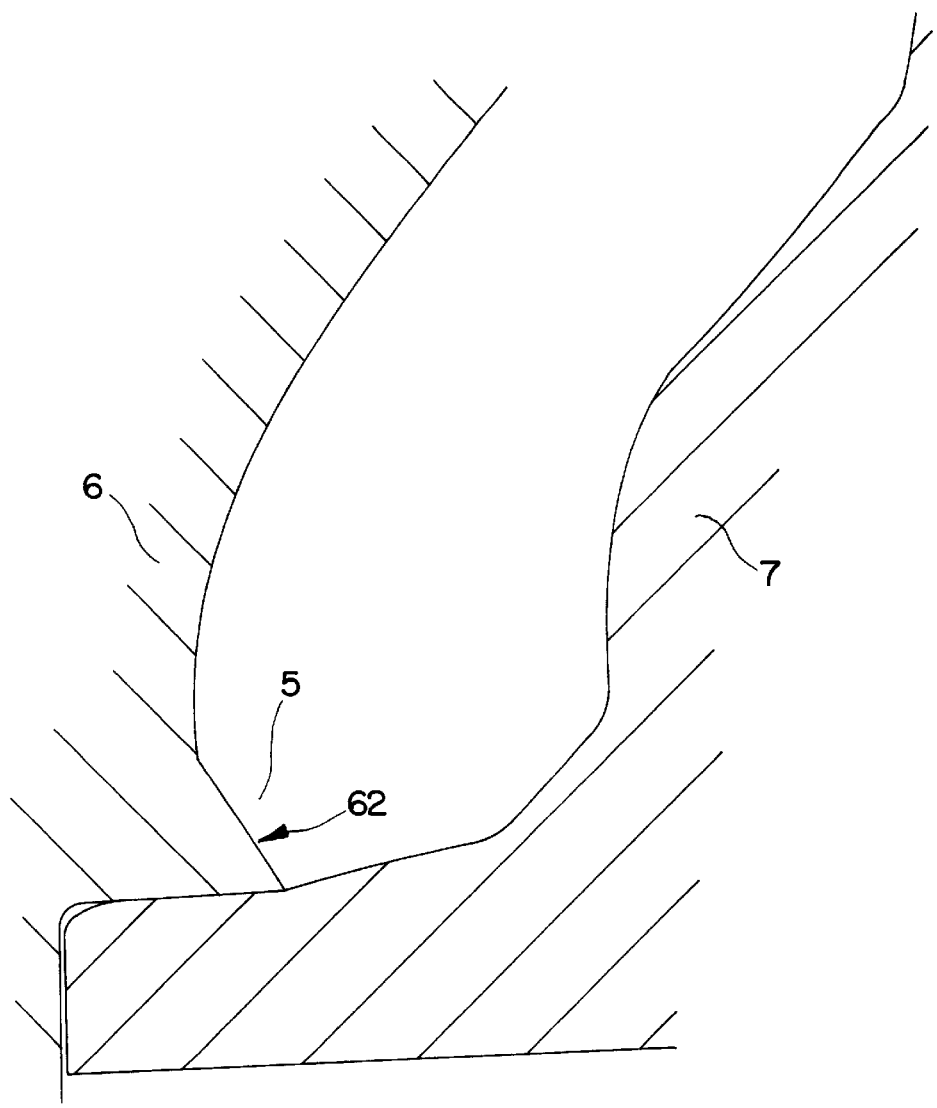
FIG. 3 shows a variant of a mold in accordance with the invention.

The base of the mold can also be provided with a frustoconical molding surface 62, as shown in FIG. 3 (small burr at interface not shown). In this latter case, there is obtained a tire the inner edge of which has at least one conical surface, the inclination of which is intermediate between the inclination of the seat and that of the side wall.

The part 6 illustrated in FIGS. 2 and 3 is either the corresponding part of a rigid core, assuring furthermore the molding of the inner cavity of a tire, or a rigid ring used to mold the lower part of the inner face of the bead, where it is desired to impose the shape taught by the invention, while the upper part is molded by a deployable flexible membrane, with which the vulcanization presses can be provided.

I claim:

1. A tire including a bead on each side of the equatorial plane of the tire, a circumferentially extending carcass anchoring means embedded in each bead, said carcass anchoring means having a radially inner and axially inner edge, each bead being defined by a substantially frustoconical seat which is inclined slightly with respect to the axis of the tire when the bead is in the mounted position, an inner edge, an inner side face and an outer side face, the bead being intended to be applied radially on top of a seat of a rim, the inner side face being directed towards the inner cavity of the tire, the inner edge forming a transition between said seat and said inner side face, the rigidity of the bead in rotation being greater than 5 mN/radian, wherein the inner edge has a rounded shape in radial section which is without bead point at the transition between the seat and the inner side face of the bead and said inner edge is shaped so that the thickness of rubber measured in a segment defined between the radially innermost and axially innermost edge of the circumferentially extending carcass anchoring means embedded in the bead and a point on the inner side face increases as said point moves from a position in which said segment is parallel to the axis of rotation of the tire to a radially inner position, so that if said bead pivots during a removal from the rim, the seat pressure does not rise.

2. A tire as set forth in claim 1 in which the zone of transition between the seat and the inner side face of the bead is without rubber or textile reinforcement.

3. A tire including a bead on each side of the equatorial plane of the tire, each bead being defined by a substantially frustoconical seat which is inclined slightly with respect to the axis of the tire when the bead is in mounted position, an inner edge, an inner side face and an outer side face, the bead being intended to be applied radially on top of a seat of a rim, the inner side wall being directed towards the inner cavity of the tire, the inner edge forming a transition between said seat and said inner side wall, the rigidity of the bead in rotation being greater than 5 mN/radian, characterized by the fact that the inner edge is without bead point at the transition between the seat and the inner side face of the bead and by the fact that the inner edge has a rounded shape in radial section and the radius of curvature of said rounded shape is $\geq 5$ mm.

4. A tire including a bead on each side of the equatorial plane of the tire, a carcass anchoring bead wire in each bead having a radially inner and axially inner edge, each bead being defined by a substantially frustoconical seat which is inclined slightly with respect to the axis of the tire when the bead is in the mounted position, an inner edge, an inner side face and an outer side face, the bead being intended to be applied radially on top of a seat of a rim, the inner side wall being directed towards the inner cavity of the tire, the inner edge forming a transition between said seat and said inner side wall, the rigidity of the bead in rotation being greater than 5 mN/radian, wherein the inner edge is without bead point at the transition between the seat and the inner side face of the bead and said inner edge has a rounded shape in radial section and the radius of curvature of the rounded shape is greater than or equal to 5 mm and is shaped so that the thickness of rubber measured in a segment defined between the radially innermost and axially innermost edge of the carcass anchoring bead wire and a point on the inner side face increases as said point moves from a position in which said segment is parallel to the axis of rotation of the tire to a radially inner position, so that if said bead pivots during removal from the rim, the seat pressure does not rise.

* * * * *

UNITED STATES PATENT AND TRADEMARK OFFICE
CERTIFICATE OF CORRECTION

PATENT NO.    : 6,257,292 B1
DATED         : July 10, 2001
INVENTOR(S)   : Yves Herbelleu It is certified that error appears in the above-identified patent and that said Letters Patent is hereby corrected as shown below:

Column 1,
Line 61, "equational" should read -- equatorial --

Column 3,
Line 35, "bead wire" should read -- bead wire 3 --

Column 5,
Line 21, "FIG. 2. The" should read -- FIG. 2. A small burr is thus formed on the surface of the tire bead seat at the interface between the re-entrant mold part 6 and the mold part 7 (see FIG. 2). The --.
Lines 23-25, "A small burr is thus formed on the surface of the tire bead seat at the interface between the re-entrant mold part 6 and the mold part 7 (see FIG. 2)." should be deleted Signed and Sealed this Twenty-ninth Day of October, 2002

*Attest:*

*Attesting Officer*

JAMES E. ROGAN
*Director of the United States Patent and Trademark Office*